US006861459B2

(12) United States Patent
Vickers et al.

(10) Patent No.: US 6,861,459 B2
(45) Date of Patent: Mar. 1, 2005

(54) OLIGOMERIC DISPERSANT

(75) Inventors: Thomas M. Vickers, Concord Township, OH (US); Rainer Packe-Wirth, Trostberg (DE); Michael Porsch, Minneapolis, MN (US); Samy M. Shendy, Cuyahoga Falls, OH (US); Lynn E. Brower, Solon, OH (US); John Pickett, Bedford, OH (US); Runhai Lu, Stow, OH (US); Frank Danko, Macedonia, OH (US); Jeffrey R. Bury, Macedonia, OH (US)

(73) Assignee: Construction Research & Technology GmbH, Trostberg (DE)

( * ) Notice: Subject to any disclaimer, the term of this patent is extended or adjusted under 35 U.S.C. 154(b) by 231 days.

(21) Appl. No.: 10/244,253

(22) Filed: Sep. 16, 2002

(65) Prior Publication Data

US 2003/0144385 A1 Jul. 31, 2003

Related U.S. Application Data

(63) Continuation-in-part of application No. 09/630,021, filed on Jul. 31, 2000, now Pat. No. 6,451,881, and a continuation-in-part of application No. 09/629,724, filed on Jul. 31, 2000, now Pat. No. 6,492,461, said application No. 09/630,021, is a continuation-in-part of application No. 09/350,394, filed on Jul. 9, 1999, now Pat. No. 6,133,347, said application No. 09/629,724, is a continuation-in-part of application No. 09/350,394, filed on Jul. 9, 1999, now Pat. No. 6,133,347.

(51) Int. Cl.$^7$ .............................................. C04B 24/32
(52) U.S. Cl. ...................... 524/5; 524/2; 524/4; 524/8; 264/228
(58) Field of Search ............................. 524/2, 4, 5, 8; 264/228

(56) References Cited

U.S. PATENT DOCUMENTS

| | | | |
|---|---|---|---|
| 2,790,724 | A | 4/1957 | Bergman |
| 3,884,871 | A | 5/1975 | Herman et al. |
| 3,947,171 | A | 3/1976 | Yasuda et al. |
| 4,093,690 | A | 6/1978 | Murray |
| 4,247,516 | A | 1/1981 | Morgan |
| 4,318,744 | A | 3/1982 | Dodson |
| 4,337,094 | A | 6/1982 | Tokar |
| 4,373,956 | A | 2/1983 | Rosskopf |
| 4,471,100 | A | 9/1984 | Tsubakimoto et al. |
| 4,508,572 | A | 4/1985 | Sakuta et al. |
| 4,519,842 | A | 5/1985 | Gerber |

(List continued on next page.)

FOREIGN PATENT DOCUMENTS

| | | |
|---|---|---|
| AU | 851793.03 | 5/1994 |
| DE | 19750245 | 5/1999 |
| DE | 19750246 | 5/1999 |
| EP | 0271435 | 6/1988 |
| EP | 612702 | 8/1994 |
| EP | 725044 | 8/1996 |
| EP | 0803521 | 10/1997 |
| EP | 849338 | 6/1998 |
| EP | 862603 | 1/2000 |
| WO | WO 98/23553 | 6/1998 |
| WO | WO 98/51637 | 11/1998 |
| WO | WO 00/44487 | 8/2000 |
| WO | WO 02/088241 A1 | 11/2002 |

OTHER PUBLICATIONS

JAPIO Publication No. 09–012351 English language abstract for JP 9012351 A—published Jan. 14, 1997.
JAPIO Publication No. 08–295547 English language abstract for JP 8295547 A—published Nov. 12, 1996.
JAPIO Publication No. 08–048852 English language abstract for JP 8048852 A—published Feb. 20, 1996.
JAPIO Publication No. 08–034652 English language abstract for JP 8034652-A—published Feb. 6, 1996.
JAPIO Publication No. 07–247149 English language abstract for JP 7247149 A—published Sep. 26, 1995.
JAPIO Publication No. 06–256054 English language abstract for JP 6256054 A—published Sep. 13, 1994.
JAPIO Publication No. 06–183603 English language abstract for JP 6183803 A—published Jul. 5, 1994.
JAPIO Publication No. 06–107446 English language abstract for JP 6107446 A—published Apr. 19, 1994.
JAPIO Publication No. 05–170501 English language abstract for JP 5170501 A—published Jul. 9, 1993.
JAPIO Publication No. 04–175253 English language abstract for JP 4175253 A—published Jun. 23, 1992.
EPO—Patent Abstracts of Japan—Publication No. 07267705—published Oct. 17, 1995 English language abstract for JP 06079358.
Colfen et al. "Crystal Design of Calcium Carbonate Nicro-particles Using Double–Hydrophilic Block Copolymers", Langmuir, p. 582–589 (Jul. 19, 1998).
Derwent WPI Publication, "Acc. No. 87–803793/198744, English language abstract for FR259534A".
Yamamota, Tuneao, et al. "Chemical Abstracts Publication XP–002152289—English language abstract for Japanese Kokai 77 76,327", vol. 88 (No. 58) (Dec. 1978).
Norihiko, et al., Dispersant for Hydraulic Composition, Publication No. 2002–087862, Published Mar. 27, 2002, Application No. JP–2000–282843 filed Sep. 19, 2000 (Patent Abstracts of Japan –machine translation).
Kazuo, et al., Dispersant for Hydraulic Composition, Publication No. 2002–060262, Published Feb. 26, 2002, Application No. JP–2000–247368 filed Aug. 17, 2000 (Patent Abstracts of Japan –machine translation).

*Primary Examiner*—Peter Szekely
(74) *Attorney, Agent, or Firm*—Renner, Kenner Greive, Bobak, Taylor & Weber

(57) ABSTRACT

A dry cast article and method for making the same, wherein the dry cast article includes an oligomeric dispersant that is a reaction product of two or three moieties is provided. To make a dry cast article, hydraulic cement, water, coarse aggregate, fine aggregate, optionally a surface active agent/air entraining agent, and an oligomeric dispersant are mixed and used to form a dry cast article from the mixture.

31 Claims, No Drawings

U.S. PATENT DOCUMENTS

| | | |
|---|---|---|
| 4,581,147 A | 4/1986 | Branch, III |
| 4,587,279 A | 5/1986 | Salyer et al. |
| 4,650,522 A | 3/1987 | Teraji et al. |
| 4,741,777 A | 5/1988 | Williams |
| 4,761,183 A | 8/1988 | Clarke |
| 4,808,641 A | 2/1989 | Yagi et al. |
| 4,814,014 A | 3/1989 | Arfaei |
| 4,866,143 A | 9/1989 | Gagnon et al. |
| 4,878,948 A | 11/1989 | Shah |
| 4,891,072 A | 1/1990 | Cooper |
| 4,946,506 A | 8/1990 | Arfaei |
| 4,946,904 A | 8/1990 | Akimoto et al. |
| 5,041,477 A | 8/1991 | Hays |
| 5,085,708 A | 2/1992 | Moriya et al. |
| 5,106,423 A | 4/1992 | Clarke |
| 5,158,996 A | 10/1992 | Valenti |
| 5,162,402 A | 11/1992 | Ogawa et al. |
| 5,223,036 A | 6/1993 | Koyata et al. |
| 5,250,113 A | 10/1993 | Berke et al. |
| 5,320,673 A | 6/1994 | Carpenter |
| 5,348,583 A | 9/1994 | Arfaei |
| 5,358,566 A | 10/1994 | Tanaka et al. |
| 5,362,324 A | 11/1994 | Cerulli et al. |
| 5,478,521 A | 12/1995 | Scheiner |
| RE35,194 E | 4/1996 | Gerber |
| 5,565,420 A | 10/1996 | Stearns |
| 5,583,183 A | 12/1996 | Darwin et al. |
| 5,604,273 A | 2/1997 | Kerkar et al. |
| 5,609,681 A | 3/1997 | Drs et al. |
| 5,612,396 A | 3/1997 | Valenti et al. |
| 5,614,017 A | 3/1997 | Shawl |
| 5,624,980 A | 4/1997 | Kobori |
| 5,665,158 A | 9/1997 | Darwin et al. |
| 5,665,842 A | 9/1997 | Leikauf |
| 5,668,195 A | 9/1997 | Leikauf |
| 5,719,204 A | 2/1998 | Beach et al. |
| 5,725,654 A | 3/1998 | Shawl et al. |
| 5,726,267 A | 3/1998 | Howland et al. |
| 5,753,744 A | 5/1998 | Darwin et al. |
| 5,849,219 A | 12/1998 | De Laat et al. |
| 5,880,182 A | 3/1999 | Minomiya et al. |
| 5,919,881 A | 7/1999 | Kinoshita et al. |
| 5,973,069 A | 10/1999 | Kataoka et al. |
| 6,048,916 A | 4/2000 | Hirata et al. |
| 6,075,075 A | 6/2000 | Dragon et al. |
| 6,174,980 B1 | 1/2001 | Hirata et al. |
| 6,176,921 B1 | 1/2001 | Kinoshita et al. |
| 6,267,814 B1 | 7/2001 | Bury et al. |
| 6,294,651 B1 | 9/2001 | Okado et al. |

OLIGOMERIC DISPERSANT

CROSS REFERENCE TO RELATED APPLICATIONS

This application is a continuation in part of U.S. Ser. No. 09/629,724, filed on Jul. 31, 2000 now U.S. Pat. No. 6,492,461 and a continuation in part of U.S. Ser. No. 09/630,021, filed on Jul. 31, 2000 now U.S. Pat. No. 6,133,347, each of which are continuations in part of U.S. Ser. No. 09/350,394, filed Jul. 9, 1999, now U.S. Pat. No. 6,133,347, all of which are incorporated herein by reference.

BACKGROUND

A cementitious mixture refers to pastes, mortars, and concrete compositions comprising a hydraulic cement binder. Pastes are defined as mixtures composed of a hydraulic cement binder, either alone or in combination with pozzolans such as fly ash, silica fume, blast furnace slag or calcined clay, and water. Mortars are defined as pastes that additionally include fine aggregate. Concretes additionally include coarse aggregate. These compositions may additionally include other admixtures such as set retarders, set accelerators, defoaming agents, air-entraining or air detraining agents, corrosion inhibitors, water reducing agents, pigments, and any other admixture or additive that does not adversely affect the advantageous results obtained by the present invention.

Dispersants are substances that improve the flow characteristics of the cement slurry by breaking up cement agglomerates and freeing the water, thus giving slurries of lower viscosity and allowing desirable flow conditions to be obtained at lower pump pressures. V. S. Ramachandran, *Concrete Admixtures Handbook: Properties, Science, and Technology*, Noyes Publications (Second Edition, 1995).

Dispersants have been used in the construction industry to disperse cementitious mixtures. Dispersants such as sulfonated melamine formaldehyde condensate (SMF), sulfonated naphthalene formaldehyde condensate (BNS), and lignosulfonates are commonly used as dispersants. However, these compounds require more than the desired amount of material to achieve a desired level of concrete workability or water reduction. In addition, these materials do not achieve full range (Type A to Type F) water reducing capability, as defined in ASTM C494. For example, lignosulfonates achieve only a low to mid range (5–12%) water reduction before severe set retardation occurs.

Dispersants are a necessary component in high strength and high durability concretes. Due to the requirement for the use of low water amounts in high performance concretes, sometimes high dispersant amounts are necessary to achieve workable concretes. High BNS levels can lead to undesirable retardation of set and may not provide the required workability retention over time.

It is desirable to provide a material that is several times more efficient as a cement or concrete dispersant than the traditional materials like lignosulfonates, BNS and SMF. Improving efficiency reduces the amount of material required to achieve a desired level of concrete workability or water reduction. With respect to the presently used dispersants, lignosulfonates, BNS and SMF, it is also desirable to improve slump retention while maintaining normal setting characteristics. Providing a dispersant with full range (Type A to F) water reducing capability is also a desirable characteristic.

One improvement in the prior art was to use polycarboxylate dispersants. Polycarboxylate dispersants are structured with a polymeric backbone, such as a carbon chain backbone, with pendant moieties. The pendant moieties provide the dispersing capabilities of the dispersant. Polycarboxylate dispersants are mostly polymers with a carbon backbone with pendant side chains, wherein at least a portion of the side chains are attached to the backbone through a carboxyl group or an ether group. For example, polyacrylic acid has carboxylic groups attached to the backbone. Also, side chain moieties such as polyoxyalkylenes can be attached to the carboxylic groups to provide further dispersing capabilities. These dispersants operate by surrounding a particle to be dispersed, and then repulsion forces between each polymer chain keeps the particles apart and more fluid.

SUMMARY

A method for making a dry cast cementitious article is provided comprising providing a mixture of hydraulic cement, water, coarse aggregate, fine aggregate, optionally a surface active agent/air entraining agent, and comprising an oligomeric dispersant, wherein the oligomeric dispersant comprises a reaction product of component A, optionally component B, and component C, wherein each component A is independently a nonpolymeric, multi-functional moiety or combination of moieties that adsorbs onto a cementitious particle, and contains at least one residue derived from a first component selected from the group consisting of phosphates, phosphonates, phosphinates, sulfates, sulfonates, sulfinates, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly (oxyalkylene amine), poly(oxyalkylene diamine), monoalkoxy poly(oxyalkylene amine), monoaryloxy poly (oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

A dry cast cementitious article is provided which is produced by one of the above mentioned methods for making a dry cast cementitious article.

DETAILED DESCRIPTION

The oligomeric dispersant does not have a polymeric backbone with pendant groups like dispersants of the prior art. Rather, the oligomeric dispersant has a moiety that will adsorb onto the particle to be dispersed by means of one or more residues attached to an adsorbing moiety of fixed molecular weight. The adsorbing moiety acts as an "anchor"

to hold the dispersant onto the particle to be dispersed, while another moiety provides dispersing capability, and an optional moiety that is disposed between the other moieties provides connections between the moieties.

A method is provided for making a dry cast cementitious article comprising a mixture of hydraulic cement, water, coarse aggregate, fine aggregate, optionally a surface active agent/air entraining agent, and comprising an oligomeric dispersant, wherein the oligomeric dispersant comprises a reaction product of component A, optionally component B, and component C, wherein each component A is independently a nonpolymeric, multi-functional moiety or combination of moieties that adsorbs onto a cementitious particle, and contains at least one residue derived from a first component selected from the group consisting of phosphates, phosphonates, phosphinates, sulfates, sulfonates, sulfinates, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

In one embodiment the A moiety contains any phosphate, phosphonate, phosphinate, or hypophosphite residue the composition of matter is further characterized by at least one of the following:

A) the composition of matter has a structure selected from the group consisting of:
    (i) $A_x$—C,
    (ii) $A_x$—C—$A_x$,
    (iii) C—$A_x$—C,
    (iv) $(C)_z$—B—$A_x$—B—$(C)_z$,
    (v) $(A_x)_y$—B—C—B—$(A_x)_y$,
and mixtures thereof;
    B) the composition of matter has a structure of $(A_x)_y$—B—$(C)_z$ with the proviso that the B moiety and the A moiety are not bound to each other through an alkylidene amine linkage;
    C) the C moiety is selected from the group consisting of poly(oxyalkylene amine), poly(oxyalkylene diamine), monoalkoxy poly(oxyalkylene amine), monoaryloxy poly(oxyalkylene amine), poly(vinyl pyrrolidones), poly(methyl vinyl ethers), poly(ethylene imines), poly(acrylamides), polyoxazoles, and mixtures thereof;
wherein x is an integer from 1 to 3 and represents the number of independent A moieties, y is an integer from 1 to 3 and represents the number of independent A moieties, and z is an integer from 1 to 3 and represents the number of independent C moieties, and forming the article from the mixture.

Each component A is independently a nonpolymeric, multi-functional moiety or combination of moieties which can be non-cyclic that adsorbs onto a particle, and contains at least one residue derived from a component selected from the group consisting of phosphates, phosphonates, phosphinates, sulfates, sulfonates, sulfinates, borates, boronates, boroxines, phosphoramides, amines, amides, quaternary ammonium groups, carboxylic acids, carboxylic acid esters, alcohols, carbohydrates, derivatives of carbohydrates, salts of any of the preceding moieties, and mixtures thereof. Derivatives of carbohydrates include, but are not limited to, phosphate esters of sugars, borate esters of sugars, and sulfate esters of sugars.

The salt of moiety A is selected from the group consisting of lithium, sodium, potassium, calcium, magnesium, aluminum, iron, ammonia, amines, and mixtures thereof. The term amines is meant to include primary, secondary, and tertiary amines, including, but not limited to, substituted amines such as triethanolamine or morpholine.

Molecules satisfying the requirement of the A moiety include, but are not limited to, multihydroxy compounds, such as sugars, sugar acids, lactones of sugar acids, sugar alcohols, tris(hydroxymethyl) aminomethane, phosphate esters of sugars, borate esters of sugars, sulfate esters of sugars, alkyl phosphates, substituted alkyl phosphates, alkyl phosphonates, substituted alkyl phosphonates, alkyl phosphinates, substituted alkyl phosphinates, aryl boronic acids, esters of aryl boronic acids, aryl dioxaborolanes, triaryl boroxines, trialkoxyboroxines, hydroxy carboxylic acids, non-polymeric polycarboxylic acids, and mixtures thereof. The alkyl groups in the above molecules are generally $C_1$ to about $C_6$ groups, the aryl groups in the above molecules are generally about $C_6$ to about $C_{10}$ groups, and the acyl groups in the above molecules are generally $C_1$ to about $C_6$ groups. The substituted alkyls can be hydroxyalkyls or carboxyalkyls.

Illustrative examples of molecules used to construct the A moiety include, but are not limited to, 2-carboxyethyl phosphonic acid, sulfosuccinic acid, citric acid, ascorbic acid, 2-phosphono-1,2,4-butane tricarboxylic acid, glucuronic acid, glucuronic lactone, ethylenediaminetetraacetic acid, gluconic acid, gluconic lactone, cyclohexane hexacarboxylic acid, mellitic acid, saccharic acid, mucic acid, diethylenetriamine pentaacetic acid, glucoheptonic acid, glucoheptonic lactone, lactobionic acid, lactobionic lactone, 3,3',4,4'-benzophenone tetracarboxylic acid, 2-(4'carboxyphenyl)-1,3,2-dioxaborolane, triphenyl boroxine, 4-carboxyphenyl boronic acid, 4-formylphenyl boronic acid, 2-(4'-formylphenyl)-1,3,2-dioxaborolane, glucooctanoic-γ-lactone, glucose, leucrose, diaminopropane-N,N,N',N'-tetraacetic acid, aconitic acid, isocitric acid, 1,2,3,4-butanetetracarboxylic acid, nitrilotriacetic acid, tricarballylic acid, N-(phosphonomethyl)iminodiacetic acid, 3-[[tris(hydroxymethyl)methyl]amino]-1-propanesulfonic acid, 2-[[tris(hydroxymethyl)methyl]amino]-1-ethanesulfonic acid, 3-[bis(2-hydroxyethyl)amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, glucosamine, galactosamine, mannosamine, tris (hydroxymethyl)aminomethane, γ-carboxyglutamic acid, glucamine, glucosamine acid, β-carboxyaspartic acid, α-hydroxymethylaspartic acid, tricine, 1,2,3,4-cyclopentanetetracarboxylic acid, 6-phosphogluconic acid, sorbitol, mannose, mannitol, mannonic acid, mannuronic acid, galactose, galactitol, galactaric acid, galacturonic acid, fructose, sucrose, salts of any of the preceding moieties, and mixtures thereof.

Each A moiety has one or more functional groups. When the A moiety has one functional group, two or more A moieties are combined to provide for multiple functional groups in the oligomeric dispersant. When the A moiety has multiple functionalities, there is no requirement that more than one A moiety must be used. Examples of the residue include, but are not limited to, hydroxyl, carboxylate, sulfate, sulfonate, sulfinate, phosphate, phosphonate, phosphinates, borate, boronate, boroxine, dioxaborolane, amine, quaternary ammonium, and mixtures thereof. The functional groups attach to the cement particle to be dispersed by adsorbing onto the cement particle. The more functional groups that are present on the A moiety, the more strongly the A moiety can anchor to the cement particle.

Component B is an optional moiety, and if present, each B is independently a nonpolymeric moiety that is disposed between the A moiety and the C moiety, and is derived from a second component selected from the group consisting of $C_1$ to about $C_6$ linear saturated hydrocarbons, $C_2$ to about $C_6$ linear unsaturated hydrocarbons, $C_3$ to about $C_6$ branched saturated hydrocarbons, $C_3$ to about $C_6$ branched unsaturated hydrocarbons, about $C_5$ to about $C_{10}$ alicyclic hydrocarbons, about $C_4$ to about $C_{10}$ heterocyclic hydrocarbons, about $C_6$ to about $C_{10}$ arylenes, nitrogen containing compounds, and mixtures thereof. Nitrogen containing compounds include, but are not limited to, any amine, urea, or isocyanate. For heterocyclic hydrocarbons, the heteroatom is preferably nitrogen, oxygen, or sulfur. The heterocyclic hydrocarbons may contain more than one heteroatom. The heteroatoms in these multiple heteroatom heterocyclic hydrocarbons may all be the same heteroatom, or they can be different.

Illustrative examples of the B moiety include, but are not limited to, methylene, ethylene, n-propylene, n-butylene, n-pentylene, n-hexylene, isobutylene, neopentylene, propenylene, isobutenylene, diethylene triamine, triethylene tetramine, tetraethylene pentamine, pentaethylene hexamine, a residue derived from toluene diisocyanate, a residue derived from isophorone diisocyanate, a residue derived from heterocyclic hydrocarbons containing two or three nitrogen

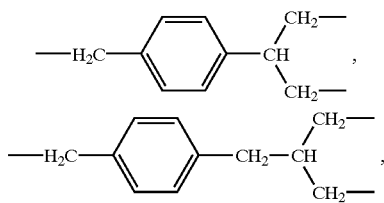

and mixtures thereof. Nitrogen heteroatom heterocyclic hydrocarbons that can be used comprise residues derived from pyrazine, residues derived from pyridazine, residues derived from pyrimidine, residues derived from pyrazole, and residues derived from melamine.

Each C component is at least one moiety that is a linear or branched water soluble, nonionic polymer substantially non-adsorbing to cement particles, and is preferably selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof.

The C moiety has a number average molecular weight from about 500 to about 100,000. Preferably, the C moiety has a number average molecular weight from about 1,000 to about 50,000. Most preferably, the C moiety has a number average molecular weight from about 1,000 to about 30,000.

The oligomeric dispersant has a number average molecular weight from about 650 to about 100,000. In one embodiment, the oligomeric dispersant can also have a number average molecular weight from 1,150 to about 50,000, and in another embodiment from about 1,150 to about 30,000.

The oligomeric dispersant can have a structure represented by the following general formulas:
 (i) $A_x$—C;
 (ii) $A_x$—C—$A_x$;
 (iii) C—$A_x$—C;
 (iv) $(A_x)_y$—B—$(C)_z$;
 (v) $(C)_z$—B—$A_x$—B—$(C)_z$;
 (vi) $(A_x)_y$—B—C—B—$(A_x)_y$;
and mixtures thereof, wherein x is preferably an integer from 1 to 3 and represents the number of independent A moieties, y is preferably an integer from 1 to 3 and represents the number of independent A moieties, and z is preferably an integer from 1 to 3 and represents the number of independent C moieties.

For further clarification, $A_x$ can be at least one of A—, A—A—, or A—A—A—; B—$(C)_z$ is preferably at least one of

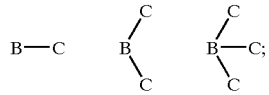

and $(A_x)_y$—B is preferably at least one of

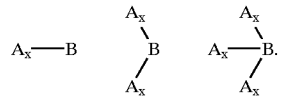

The oligomeric dispersant can be added to a dry cast cementitious mixture as an admixture alone or in combination with other admixtures.

The oligomeric dispersant is generally present in the cementitious formulation in an amount from about 0.005 to about 0.3% based on the dry weight of the cement.

By any other cementitious dispersant it is meant to include all chemicals that function as a dispersant, water reducing agent, or plasticizer for cement. Illustrative examples include, but are not limited to, sulfonated naphthalene formaldehyde polymers, sulfonated melamine formaldehyde polymers, lignosulfonates, polyacrylic acids, polymethacrylic acids, polycarboxylates, and polyaspartates and their polyether derivatives.

Additionally, a dry cast cementitious article can be produced using any of the previously mentioned methods for making a dry cast cementitious article.

Cementitious dry cast mixtures generally comprise hydraulic cement, dispersant, fine aggregate, coarse aggregate, and optionally surface active agent/air entraining agent, pozzolans such as silica fume, fly ash, slag or calcined clay, and pigments. Water is added to form the cementitious mixture into an extremely stiff consistency.

The hydraulic cement comprising the dry cast mixture for which the dispersants are effective is selected from the group consisting of portland cement, masonry cement, oil well cement, alumina cement, refractory cement, magnesia cement, calcium sulfoaluminate cement, and mixtures thereof.

The coarse aggregate can be silica, quartz, crushed round marble, glass spheres, granite, limestone, calcite, feldspar, alluvial sands, any other durable aggregate, and mixtures thereof. The fine aggregate can be sand, any other suitable aggregate, and mixtures thereof.

Cementitious dry cast mixtures have been found to respond to vibration or applied energy when the mixture is properly proportioned. When the mold is subjected to vibration or other energy, the paste fraction of the mixture functions as the vehicle/lubricant by which the solid aggregate particles move and orient themselves during consolidation.

The reduced water content provides cementitious dry cast mixtures with stiff to extremely dry consistencies, with typical W/C ratios at or below 0.36, preferably at or below 0.30. Without being limited by theory, it is theorized that the reduced water content allows the cementitious dry cast mixture to hydrate and set faster which increases the green strength of an article formed from the cementitious dry cast mixture. This is also thought to result in reduced sagging and deformation when the article is removed from a mold or is extruded from a die. Additionally, the cementitious dry cast mixtures have the appearance of dry to almost dry.

Addition of silica fume increases the cohesiveness of the cementitious dry cast mixture which then increases the green strength of an article formed from the cementitious dry cast mixture. Silica fume can be uncompacted or can be partially compacted. Silica fume additionally reacts with the hydration byproducts of the cement binder which provides for increased strength of the finished articles and decreases the permeability of the finished articles. The silica fume, or other pozzolans such as fly ash slag or calcined clay such as metakaolin, can be added to the cementitious dry cast mixture in an amount from about 5% to about 70% based on the total cementitious content.

By allowing for a reduced W/C ratio, improved paste lubricity and increased green strength, the cycle time of producing an individual article from a cementitious dry cast mixture is reduced. Compared to dry cast mixtures of the prior art, cycle time reductions are improved by 50 to 100%. By allowing articles to be removed from the molds in a shorter period of time or by increasing the rate of extrusion, the cycle time for producing each article is reduced. Additionally, more articles can now be produced in the same equipment. These factors combine to reduce the cost of manufacture of each article, such as masonry blocks.

The surface active agent/air entraining agent can be any known surface active agents/air entraining agents for cement including anionic, cationic, nonionic surfactants, natural resin, synthetic resin, natural rosin, synthetic rosin, any inorganic air entraining agent, and mixtures thereof.

Illustrative examples of surface active agent/air entraining agents that can be used include, but are not limited to, alkanolamides, alkanolamines, alkylaryl sulfonates, polyethylene oxide-polypropylene oxide block copolymers, alkylphenol ethoxylates, fatty acids, ethoxylates of fatty acids, sulfonates of fatty acids, sulfates of fatty acids, fluorocarbon containing surfactants, silicon containing surfactants, olefin sulfonates, olefin sulfates, and mixtures thereof. A foaming agent that can be used is ethoxylated nonylphenol.

The foaming agent is added in an amount from about 0.001% to about 0.4% based on the weight of cement, preferably about 0.005% to about 0.012%.

Alkanolamide foaming agents include, but are not limited to, those having from about 12 to about 20 carbon atoms Alkanolamine foaming agents include, but are not limited to, those having from about 12 to about 20 carbon atoms.

Alkylaryl sulfonate foaming agents include, but are not limited to, those having one aryl group and having alkyl groups with about 12 to about 20 carbon atoms.

Polyethylene oxide-polypropylene oxide block copolymer foaming agents include, but are not limited to, those having about 4 to about 50 units of each block.

Alkylphenol ethoxylate foaming agents include, but are not limited to, those having an alkyl group of about 4 to about 50 carbon atoms.

Fatty acid foaming agents include, but are not limited to, those in which the fatty acid moiety has about 6 to about 20 carbon atoms.

Ethoxylates of fatty acid foaming agents include, but are not limited to, those in which the number of ethoxylate groups is about 4 to about 20 and the fatty acid moiety has about 6 to 20 carbon atoms.

Sulfonates of fatty acid foaming agents include, but are not limited to, those in which the fatty acid moiety has about 6 to about 20 carbon atoms.

Sulfates of fatty acid foaming agents include, but are not limited to, those in which the fatty acid moiety has about 6 to about 20 carbon atoms.

Fluorocarbon containing surfactant foaming agents include, but are not limited to, those having about 6 to about 20 carbon atoms and one or more $CH_2$ moieties are replaced by $CF_2$ moieties.

Olefin sulfonate foaming agents include, but are not limited to, those having about 12 to about 20 carbon atoms.

Olefin sulfate foaming agents include, but are not limited to, those having about 12 to about 20 carbon atoms.

Representative examples of surfactant that can be used as the surface active agent/air entraining agent include ethoxylated nonylphenol, alpha olefin sulfonate, or cocamide DEA.

Additionally, cement admixtures may be included in the cementitious formulation. Cement additives that can be added include, but are not limited to, set accelerators, set retarders, air entraining agents, air detraining agents, foaming agents, defoaming agents, corrosion inhibitors, shrinkage reducing agents, other known dispersing agents, pozzolans, pigments, and mixtures thereof.

Oligomeric dispersants were synthesized and tested as described below. The molecular weights used herein are number average molecular weights. The following concrete tests were used: Slump (ASTM C143), Air content (ASTM C231), and Set time (ASTM C403). Aggregates met the specifications of ASTM C33.

Synthesis Example 1

1.1 g (0.003 mole) of 1,2,3,4,5,6-cyclohexane hexacarboxylic acid was suspended in 5.5 g of deionized water. 6.52 g of methoxy polyoxyalkylene amine (JEFFAMINE® M-2070 (XTJ-508) from Huntsman Corporation with a 2000 molecular weight) was slowly added to the mixture to achieve a homogeneous solution. 0.001 g of 4-methoxy phenol was added while stirring the solution. The solution was heated to 180° C. under nitrogen gas stream for 60 minutes. The reaction mixture was cooled to room temperature. The reaction product was dissolved in aqueous sodium hydroxide solution to obtain a 39.1% solids solution at a pH of 8.4.

Synthesis Example 2

0.57 g (3.7 mmole) of 2-carboxyethylphosphonic acid was dissolved in 6 g of water and 11.11 g (3.7 mmole) of methoxypolyoxyalkylene amine (M3000 from BASF with a 3000 molecular weight) was added. The mixture was heated under nitrogen at 160° C. for 4.5 hours.

Synthesis Example 3

2.44 g of gluconic acid solution (48.2% aqueous solution) was combined with 2 g of deionized water in a 50 ml round bottom flask. 6.12 g of methoxy polyoxyalkylene amine (JEFFAMINE® M-1000 (XTJ-506) from Huntsman Corporation with a 1000 molecular weight) was added in portions while stirring. 0.002 g of 4-methoxy phenol was added. The solution was heated to 160° C. under nitrogen stream for 90 minutes. The mixture was cooled to room temperature. The reaction mixture was dissolved in water to obtain a 40% solids solution at neutral pH.

Synthesis Example 4

131.6 g (0.048 equivalents of amine) of methoxy polyoxyalkylene amine (JEFFAMINE® XTJ-234 from Huntsman Corporation with a 3000 molecular weight) was combined with 10 g (0.048 mole) of α-D-glucoheptonic-γ-lactone in an oven dried 250 ml round bottom flask. The stirred mixture was heated to 110° C. under a dry nitrogen gas purge for 5.5 hours.

EXAMPLE 1

Oligomeric dispersants were prepared and compared to dispersants of the prior art. For the A moiety, 1,2,3,4,5,6-cyclohexane hexacarboxylic acid was used in all samples for this example. For the C moiety, methoxy polyoxyalkylene amines were used. The following materials were used for the samples: Sample A, JEFFAMINE® M-1000 (XTJ-506) from Huntsman Corporation with a 1000 molecular weight; Sample B, JEFFAMINE® M-2070 (XTJ-508) from Huntsman Corporation with a 2000 molecular weight; Sample C, JEFFAMINE® XTJ-234 from Huntsman Corporation with a 3000 molecular weight; and sample D methoxy polyoxyethylene amine from Shearwater Polymers, Inc. with a 5000 molecular weight. Finally, a beta-naphthalene sulfonate formaldehyde condensate (BNS) dispersant was tested as a comparison. The specific level of dispersant used is listed below in Table 1.

The water to cement ratio used was 0.35. The oligomeric dispersant and water were hand mixed into 500 g of Portland Type I cement and mixed to a uniform consistency. The paste was then mechanically mixed at 700 rpm for one minute.

The results of the testing are shown below in Table 1.

TABLE 1

| Sample | Dose (% of cement) | Paste Mass Flow Rate (g/sec) | Paste Spread Diameter (cm) |
|---|---|---|---|
| A | 0.2 | 109 | 12.6 |
| B | 0.2 | 66 | 11.0 |
| C | 0.2 | 59 | 10.7 |
| D | 0.2 | 53 | 10.6 |
| BNS | 0.2 | 17 | 0 |

The molecular weight of the "C" moiety of the oligomeric dispersants did not have a large influence on paste mass flow rate and paste spread diameter. Compared to the BNS dispersants of the prior art, performance was improved.

EXAMPLE 2

The relationship between the number of attached C moieties on the A moiety and performance was tested. For the A moiety, 1,2,3,4,5,6-cyclohexane hexacarboxylic acid was used in all samples for this example. For the C moiety, a methoxy polyoxyalkylene amine, JEFFAMINE® M-1000 (XTJ-506) from Huntsman Corporation with a 1000 molecular weight was used. The molar ratio of the A moiety to the C moiety for the samples were: Sample A 1:1 (corresponding to general formula i, $A_x$—C; same sample from Example 1); Sample E 1:1.25, and Sample F 1:1.75 (E and F correspond to general formula iii, C—$A_x$—C). The prior art comparative example was the same as in Example 1. The samples were prepared as described above in Example 1. The results of the testing are shown below in Table 2.

TABLE 2

| Sample | Dose (% of cement) | Paste Mass Flow Rate (g/sec) | Paste Spread Diameter (cm) |
|---|---|---|---|
| A | 0.2 | 109 | 12.6 |
| E | 0.2 | 61 | 10.8 |
| F | 0.2 | 13 | 0 |
| BNS | 0.2 | 17 | 0 |

As shown in Table 2, as more C moieties are attached to the A moiety, the effectiveness as a dispersant decreases. As more C moieties are added, there are fewer functional groups with which to adsorb onto the particle to be dispersed. Anchor group binding strength is preferably balanced with the C moiety size and number for optimum performance.

EXAMPLE 3

The relationship of A moiety structure on dispersability was tested at a higher water to cement ratio. Samples A, B, C, D, and F were prepared as described above. Sample G was prepared with 2-carboxyethylphosphonate as the A moiety with a methoxy polyoxyalkylene amine, JEFFAMINE® M-1000 (XTJ-506) from Huntsman Corporation with a 1000 molecular weight, as the C moiety. Also, the samples were compared to a plain paste without any dispersant, and a calcium lignosulfonate dispersant containing sample was tested as a comparison. The water to cement ratio in this example was 0.42. The mix procedure was the same as in Example 1, except that each paste, except sample G, was stored for five minutes and then mechanically re-mixed for one minute at 700 rpm. Sample G was mixed as in Example 1. The test results are shown in Table 3 below.

TABLE 3

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Plain | — | 60 | 29 | 9.7 | 7.8 |
| A | 0.1 | 128 | 101 | 13.0 | 12.2 |
| F | 0.1 | 116 | 73 | 12.1 | 11.4 |
| B | 0.1 | 133 | 90 | 13.0 | 12.3 |

TABLE 3-continued

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| C | 0.1 | 121 | 91 | 12.6 | 11.2 |
| D | 0.1 | 122 | 79 | 12.6 | 11.2 |
| G | 0.2 | 75 | 51 | 10.9 | 10.4 |
| Ca Ligno-sulfonate | 0.19 | 86 | 44 | 11.0 | 9.6 |
| BNS | 0.1 | 80 | 33 | 10.5 | 8.6 |

The results in Table 3 show that the plain sample and the lignosulfonate sample lose about half of the flow in about 20 minutes. The BNS loses more than half of the initial flow. The oligomeric dispersants, however, lose less than half of the initial flow in the same time period. The oligomeric dispersants perform better than lignosulfonates at a lower dosage and perform better than BNS at the same dosage.

EXAMPLE 4

The relationship of oligomeric dispersant structure, as influenced by C moiety molecular weight, to initial set time of a cement paste was tested. The oligomeric dispersants tested were those from the above examples. The water to cement ratio was 0.35. All dispersants were added at 0.2% based on the weight of cement. The mixing was the same as described above in Example 1. The initial set time was tested using a Form+Test automated set time apparatus using 300 g of each prepared paste. The results are listed in Table 4 below.

TABLE 4

| Sample | MW of C Moiety | Initial Set Time (hours) |
|---|---|---|
| A | 1000 | 12.1 |
| B | 2000 | 10.2 |
| C | 3000 | 7.5 |
| D | 5000 | 6.1 |
| Ca Lignosulfonate | N/A | 6.5 |
| BNS | N/A | 4.9 |

N/A = not applicable

Table 4 shows that as the molecular weight of the C moiety increases, the initial set time is reduced.

EXAMPLE 4A

The relationship of the number of attached C moieties on the A moiety in the oligomeric dispersant structure to initial set time of a cement paste was tested. The dispersants are those from the above examples. The water to cement ratio was 0.35. All dispersants were added at 0.2% based on the weight of cement. The mixing was the same as above Example 1. The initial set time was tested using a Form+Test automated set time apparatus using 300 g of each prepared paste. The results are listed in Table 4A below.

TABLE 4A

| Sample | Molar Ratio A moiety to C moiety | Initial Set Time (hours) |
|---|---|---|
| A | 1:1 | 12.1 |
| E | 1:1.25 | 10.2 |
| F | 1:1.75 | 7.0 |
| Ca Lignosulfonate | N/A | 6.5 |
| BNS | N/A | 4.9 |

N/A = not applicable

The results in Table 4A show that as more C moieties are attached to the A moiety, the initial set time decreases.

EXAMPLE 5

The relationship of the A moiety functionality to fluidity of a cement paste was tested. The water to cement ratio was 0.35. The preparation of the paste samples was the same as in Example 3 above. The C moieties for the samples were methoxy polyoxyalkylene amine, JEFFAMINE® M-1000 (XTJ-506) from Huntsman Corporation with a 1000 molecular weight, for Samples 2–6, and methoxy polyoxyethylene glycol from Union Carbide Corporation with a 2000 molecular weight, for Sample 1.

TABLE 5

| Sample | Starting A moiety | A Moiety Functionality after attachment to the C moiety | C Moiety MW | Number of A Moieties | Dose (% of cement) | Paste Mass Flow Rate (g/sec) | Paste Spread Diameter (cm) |
|---|---|---|---|---|---|---|---|
| 1 | succinic anhydride | 1-COOH | 2000 | 1 | 0.2 | 0 | 0 |
| 2 | 2-carboxyethyl phosphonic acid | 1-PO$_3$H$_2$ | 1000 | 1 | 0.3 | 7.9 | 0 |
| 3 | citric acid | 2-COOH 1-OH | 1000 | 1 | 0.3 | 14 | 0 |
| 4 | 1,2,3,4,5,6-cyclohexane hexacarboxylic acid | 5-COOH | 1000 | 1 | 0.2 | 109 | 12.6 |

TABLE 5-continued

| Sample | Starting A moiety | A Moiety Functionality after attachment to the C moiety | C Moiety MW | Number of A Moieties | Dose (% of cement) | Paste Mass Flow Rate (g/sec) | Paste Spread Diameter (cm) |
|---|---|---|---|---|---|---|---|
| 5 | mellitic acid | 5-COOH | 1000 | 1 | 0.2 | 72 | 10.0 |
| 6 | gluconic acid | 5-OH | 1000 | 1 | 0.2 | 62 | 12.7 |

The total number of active functional groups on the A moiety(s) influences the performance of the oligomeric dispersant. As the total number of active functional groups increases, the dispersing performance increases.

EXAMPLE 6

The A moiety was varied to compare performance against prior art dispersants and a plain cement paste reference. The A moieties tested are listed below in Table 6. The C moiety was a methoxy polyoxyalkylene amine, JEFFAMINE® XTJ-234 from Huntsman Corporation with a 3000 molecular weight. The reference dispersant was a polymeric carboxylate backbone with polyether group side chains. The water to cement ratio was 0.35. The mix procedure was the same as in Example 1. The results are listed below in Table 6.

TABLE 6

| Sample | Dose (% of cement) | Initial Paste Mass Flow Rate (g/sec) | Final Paste Mass Flow Rate (g/sec) | Initial Spread Diameter (cm) | Final Spread Diameter (cm) |
|---|---|---|---|---|---|
| Plain | — | 0 | 0 | 0 | 0 |
| Gluconate as "A" | 0.2 | 66 | 53 | 14 | 14 |
| Glucoheptonate as "A" | 0.15 | 95 | 85 | 19.5 | 19.5 |
| Glucoheptonate as "A" | 0.1 | 71 | 58 | 14.7 | 14.5 |
| Ca Lignosulfonate | 0.3 | 5.6 | 0 | 0 | 0 |
| BNS | 0.3 | 81 | 25 | 10.7 | 7.3 |
| Ref. Polycarboxylate | 0.1 | 110 | 73 | 16.7 | 16.0 |

The results in Table 6 show improved dispersant performance by the oligomeric dispersants over the calcium lignosulfonate and BNS dispersants, and comparable performance to the polymeric carboxylate/polyether dispersant. Also, glucoheptonate (with 6 hydroxyl groups) as the A moiety performs better than gluconate (with 5 hydroxyl groups) as the A moiety.

EXAMPLE 7

Several oligomeric dispersants were compared to a plain sample and a calcium lignosulfonate dispersant in a concrete formulation. The A moiety was either gluconate or glucoheptonate. The C moiety was a methoxy polyoxyalkylene amine, being either JEFFAMINE® M-2070 (XTJ-508) from Huntsman Corporation with a 2000 molecular weight or JEFFAMINE® XTJ-234 from Huntsman Corporation with a 3000 molecular weight.

The plain mix consisted of 12.1 kg of Portland cement, 37.8 kg of crushed stone, 24.9 kg of sand, and 6.65 kg of water to provide a water to cement ratio of 0.55. The amount of dispersant is listed below in Table 7. The mixes were adjusted with sand and stone to compensate for the reduced water requirement with a dispersant to maintain a constant concrete volume for all mixes. Dispersed mixes contained less water, as indicated by the % water reduction in Table 7.

The concrete mixer was loaded with a portion of the mix water. The dispersant, stone, cement and sand were added to the mixer. The mixer was started and the remaining water was added. The mixture was mixed for 5 minutes at a drum rotation rate of about 19 rpm. Note, mixes 3–6 contained a defoamer, which was a non-silicone proprietary mixture sold as SURFYNOL® DF-75 from Air Products, added at 0.75% by weight of the dispersant.

TABLE 7

| Sample | Dose (%) | Water Reduction (%) | Slump (in) | % Air | Initial Set Time | Compressive Strength (Mpa) 1 day | 11 days | 28 days |
|---|---|---|---|---|---|---|---|---|
| Plain | — | — | 7.5 | 0.8 | 5:08 | 1360 | 4200 | 4980 |
| Calcium Lignosulfonate | 0.2 | 8 | 7.75 | 1.4 | 6:51 | 1770 | 5550 | 6420 |
| Gluconate/ XTJ-508 | 0.2 | 10.4 | 7.75 | 4.4 | 7:01 | 1770 | 4970 | 5880 |
| Gluconate/ XTJ-234 | 0.2 | 10 | 7.5 | 2.1 | 6:17 | 1930 | 5030 | 6300 |
| Glucoheptonate/ XTJ-234 | 0.2 | 15.1 | 8 | 1.5 | 6:17 | 2600 | 6510 | 7410 |
| Glucoheptonate/ XTJ-508 | 0.2 | 16.8 | 8.25 | 1.6 | 6:48 | 2490 | 6800 | 7750 |

Oligomeric dispersant produces greater water reduction than lignosulfonate dispersants at the same dosage. Better performing oligomeric dispersants were less retarding with greater water reduction and produced higher concrete compressive strength. Glucoheptonate anchor performs better than the gluconate anchor.

EXAMPLE 8

A concrete batch was prepared to compare dispersants of the present invention to BNS and polycarboxylate dispersants. The oligomeric dispersant of the present invention used a glucoheptonate molecule as the A moiety and as the C moiety, a methoxy polyoxyalkylene amine, namely JEFFAMINE® M-2070 (XTJ-508) from Huntsman Corporation with a 2000 molecular weight (2K), or JEFFAMINE® XTJ-234 from Huntsman Corporation with a 3000 molecular weight (3K). The reference dispersant was a polymeric carboxylate backbone with polyether group side chains.

The mix consisted of 20.5 kg of Portland cement, 61 kg of crushed stone, 46 kg of sand, and 9.03 kg of water to provide a water to cement ratio of 0.46. The amount of dispersant is listed below in Table 8.

The concrete mixer was loaded with a portion of the mix water. The dispersant, stone, cement and sand were added to the mixer. The mixer was started and the remaining water was added. The mixture was mixed for 5 minutes at a drum rotation rate of about 19 rpm. The slump and air were measured initially. The mixer rate was reduced to about 4 rpm until one minute before each sample time. At one minute before taking the sample, the mixer rate was increased to about 19 rpm. Note, all mixes, except the BNS mix, contained a defoamer, which was a non-silicone proprietary mixture sold as SURFYNOL® DF-75 from Air Products, added at 0.75% by weight of the dispersant.

TABLE 8

| Sample | Dose % cement | % Air Initial | % Air 45 min | % Air 65 min | Slump (mm) Initial | Slump (mm) 45 min | Slump (mm) 65 min | Set Time (hours) |
|---|---|---|---|---|---|---|---|---|
| Gluco.3k | 0.2 | 1.4 | 1.9 | 2 | 230 | 170 | 115 | 6 |
| BNS | 0.4 | 2.2 | 1.7 | — | 215 | 70 | — | 5 |
| Polycarboxylate | 0.14 | 1.7 | 1.8 | 2.1 | 205 | 120 | 120 | 5 |
| Polycarboxylate | 0.16 | 1.1 | 2 | 2.1 | 230 | 180 | 165 | 5.75 |

The results in Table 8 show that the oligomeric dispersant of the present invention has improved slump retention as compared to BNS, and performs comparably to the reference polycarboxylates to provide improved slump retention properties.

An oligomeric dispersant is provided for dispersing cementitious particles, for use in dry cast articles, wherein the oligomeric dispersant adsorbs onto the particle to be dispersed to provide a material that is several times more efficient than traditional dispersants, such as beta naphthalene sulfonates, sulfonated melamine formaldehyde condensates, or calcium lignosulfonates, and to provide a full range (Type A to Type F) water reducing capability. Also provided are novel oligomeric dispersant compositions of matter, which include a reaction product of component A, optionally component B, and component C;

wherein each component A is independently a nonpolymeric, functional moiety that adsorbs onto a cementitious particle, and contains at least one residue derived from a first component selected from the group consisting of phosphates, phosphonates, phosphinates, sulfates, sulfonates, sulfinates, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof;

An oligomeric dispersant composition of matter is represented by the following general structure (I):

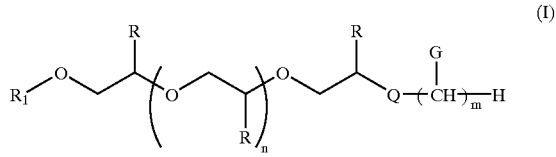

wherein

R$_1$ is at least one of H, C$_1$–C$_{18}$ alkyl, phenyl, benzyl, or alkyl sulfonate;

each R is independently at least one of H, methyl, ethyl, propyl, butyl, or phenyl;

Q is at least one of carboxylic ester, thioester, amide, urethane, urea, ether, amine, a residue derived from isocyanate, hydroxy alkylidene amine, and hydroxy alkylidene ether;

G is at least one of —H, —OH, —COOH, a phosphate, a phosphonate, a phosphinate, sulfate, sulfonate, sulfinate, borate, and amine;

n=10–500;

m=2–10.

Note that the structure in the parentheses with "m" does not connote a polymer. It is only short-hand to represent a two to ten carbon backbone structure.

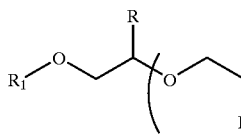

Residues that can be derived from isocyanate are a residue derived from toluene diisocyanate and a residue derived from isophorone diisocyanate.

Other oligomeric dispersant compositions of matter according to general structure (I) can be the following:

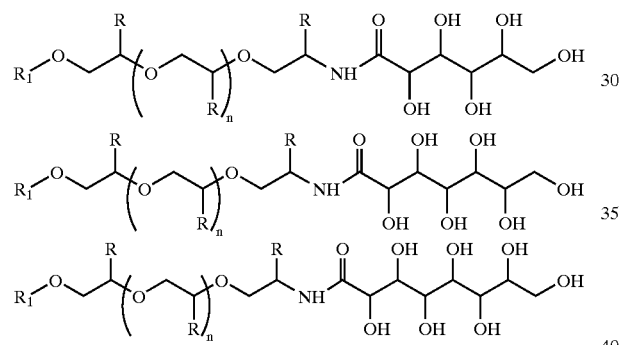

Another oligomeric dispersant composition of matter is represented by the following general structure (II):

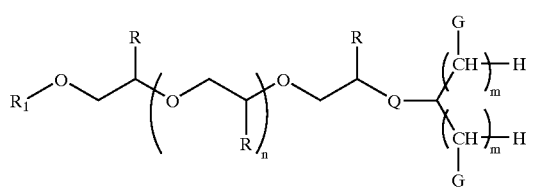

wherein $R_1$ is at least one of H, $C_1$–$C_{18}$ alkyl, phenyl, benzyl, or alkyl sulfonate;

each R is independently at least one of H, methyl, ethyl, propyl, butyl, or phenyl;

Q is at least one of carboxylic ester, thioester, amide, urethane, urea, ether, amine, a residue derived from isocyanate, hydroxy alkylidene amine, and hydroxy alkylidene ether;

G is at least one of —H, —OH, —COOH, a phosphate, a phosphonate, a phosphinate, sulfate, sulfonate, sulfinate, borate, and amine;

n=10–500;

m=2–10.

In some compositions the total number of functional (non-hydrogen) residues for G for the entire composition of matter is at least two. For example, each branch in the composition of matter could each have one functional residue for G.

An oligomeric dispersant composition of matter according to general structure (II) is:

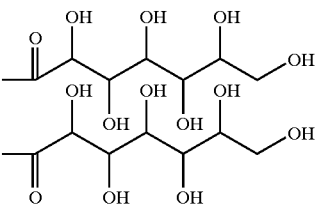

The oligomeric dispersants are useful in dry cast articles and the methods to make them.

It should be appreciated that the present invention includes variations, modifications and equivalent embodiments defined by the following claims.

What is claimed is:

1. A method for making a dry cast cementitious article comprising:
   a. providing a mixture of hydraulic cement, water, coarse aggregate, fine aggregate, optionally a surface active agent/air entraining agent, and comprising an oligomeric dispersant, wherein the oligomeric dispersant comprises a reaction product of component A, optionally component B, and component C;
   wherein each component A is independently a nonpolymeric, multi-functional moiety or combination of moieties that adsorbs onto a cementitious particle, and contains at least one residue derived from a first component selected from the group consisting of phosphates, phosphonates, phosphinates, sulfates, sulfonates, sulfinates, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;
   wherein component B is an optional moiety, where if present, each component B is independently a non-polymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and
   wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof; and
  b. forming the article from the mixture.

2. The method of claim 1 wherein the oligomeric dispersant has a structure selected from the group consisting of
  (i) $A_x$—C;
  (ii) $A_x$—C—$A_x$;
  (iii) C—$A_x$—C;
  (iv) $(A_x)_y$—B—$(C)_z$;
  (v) $(C)_z$—B—$A_x$—B—$(C)_z$;
  (vi) $(A_x)_y$—B—C—B—$(A_x)_y$;
and mixtures thereof, wherein x is an integer from 1 to 3 and represents the number of independent A moieties, y is an integer from 1 to 3 and represents the number of independent A moieties, and z is an integer from 1 to 3 and represents the number of independent C moieties.

3. The method of claim 1 further characterized by at least one of the following:
  a. the oligomeric dispersant is present in an amount from about 0.005 to about 0.3% based on the dry weight of the cement;
  b. the B moiety is selected from the group consisting of about $C_5$ to about $C_{10}$ alicyclic hydrocarbons, about $C_4$ to about $C_{10}$ heterocyclic hydrocarbons, and mixtures thereof.

4. The method of claim 1 wherein the A moiety is selected from the group consisting of sugars, sugar acids, lactones of sugar acids, sugar alcohols, tris(hydroxymethyl) aminomethane, phosphate esters of sugars, borate esters of sugars, sulfate esters of sugars, alkyl phosphates, substituted alkyl phosphates, alkyl phosphonates, substituted alkyl phosphonates, alkyl phosphinates, substituted alkyl phosphinates, aryl boronic acids, esters of aryl boronic acids, aryl dioxaborolanes, triaryl boroxines, trialkoxyboroxines, hydroxy carboxylic acids, non-polymeric polycarboxylic acids, and mixtures thereof, and wherein the alkyl groups in the above molecules are $C_1$ to about $C_6$ groups, and the aryl groups in the above molecules are about $C_6$ to about $C_{10}$ groups, and wherein the substituted alkyls are selected from the group consisting of hydroxyalkyls, carboxyalkyls, and mixtures thereof.

5. The method of claim 4, wherein the salt of moiety A is selected from the group consisting of lithium, sodium, potassium, calcium, magnesium, aluminum, iron, ammonia, amines, and mixtures thereof.

6. The method of claim 1 wherein the A moiety is selected from the group consisting of 2-carboxyethyl phosphonic acid, sulfosuccinic acid, citric acid, ascorbic acid, 2-phosphono-1,2,4-butane tricarboxylic acid, glucuronic acid, glucuronic lactone, ethylenediaminetetraacetic acid, gluconic acid, gluconic lactone, cyclohexane hexacarboxylic acid, mellitic acid, saccharic acid, mucic acid, diethylenetriamine pentaacetic acid, glucoheptonic acid, glucoheptonic lactone, lactobionic acid, lactobionic lactone, 3,3',4, 4'-benzophenone tetracarboxylic acid, 2-(4'carboxyphenyl)-1,3,2-dioxaborolane, triphenyl boroxine, 4-carboxyphenyl boronic acid, 4-formylphenyl boronic acid, 2-(4'-formylphenyl)-1,3,2-dioxaborolane, glucooctanoic-γ-lactone, glucose, leucrose, diaminopropane-N,N,N',N'-tetraacetic acid, aconitic acid, isocitric acid, 1,2,3,4-butanetetracarboxylic acid, nitrilotriacetic acid, tricarballylic acid, N-(phosphonomethyl)iminodiacetic acid, 3-[[tris(hydroxymethyl)methyl]amino]-1-propanesulfonic acid, 2-[[tris(hydroxymethyl)methyl]amino]-1-ethanesulfonic acid, 3-[bis(2-hydroxyethyl)amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, glucosamine, galactosamine, mannosamine, tris (hydroxymethyl)aminomethane, γ-carboxyglutamic acid, glucamine, glucosamine acid, β-carboxyaspartic acid, α hydroxymethylaspartic acid, tricine, 1,2,3,4-cyclopentanetetracarboxylic acid, 6-phosphogluconic acid, sorbitol, mannose, mannitol, mannonic acid, mannuronic acid, galactose, galactitol, galactaric acid, galacturonic acid, fructose, sucrose, salts of any of the preceding moieties, and mixtures thereof.

7. The method of claim 1 wherein the salt of moiety A is selected from the group consisting of lithium, sodium, potassium, calcium, magnesium, aluminum, iron, ammonia, amines, and mixtures thereof.

8. The method of claim 1 wherein the B moiety is selected from the group consisting of $C_1$ to about $C_6$ linear saturated hydrocarbons, $C_2$ to about $C_6$ linear unsaturated hydrocarbons, $C_3$ to about $C_6$ branched saturated hydrocarbons, $C_3$ to about $C_6$ branched unsaturated hydrocarbons, about $C_5$ to about $C_{10}$ alicyclic hydrocarbons, about $C_4$ to about $C_{10}$ heterocyclic hydrocarbons, about $C_6$ to about $C_{10}$ arylenes, nitrogen containing compounds, and mixtures thereof.

9. The method of claim 8, wherein the B moiety is selected from the group consisting of methylene, ethylene, n-propylene, n-butylene, n-pentylene, n-hexylene, isobutylene, neopentylene, propenylene, isobutenylene, diethylene triamine, triethylene tetramine, tetraethylene pentamine, pentaethylene hexamine, a residue derived from toluene diisocyanate, a residue derived from isophorone diisocyanate, a residue derived from a two nitrogen heteroatom heterocyclic hydrocarbon, a residue derived from a three nitrogen heteroatom heterocyclic hydrocarbon, phenylene, substituted arylenes, and mixtures thereof.

10. The method of claim 8, wherein the B moiety is selected from the group consisting of

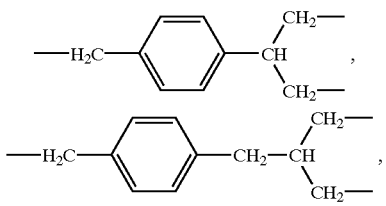

and mixtures thereof.

11. The method of claim 1, further characterized by at least one of the following:
  a. the C moiety has a number average molecular weight from about 500 to about 100,000;
  b. the C moiety has a number average molecular weight from about 1,000 to about 50,000;
  c. the C moiety has a number average molecular weight from about 1,000 to about 30,000.

12. The method of claim 1 further characterized by at least one of the following:
  a. the oligomeric dispersant has a number average molecular weight from about 650 to about 100,000;
  b. the oligomeric dispersant has a number average molecular weight from about 1,150 to about 50,000;
  c. the oligomeric dispersant has a number average molecular weight from about 1,150 to about 30,000.

13. The method of claim 1 wherein the oligomeric dispersant is represented by the following structure:

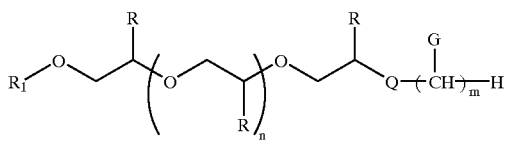

wherein
R₁ is at least one of H, $C_1$–$C_{18}$ alkyl, phenyl, benzyl, or alkyl sulfonate; each R is independently at least one of H, methyl, ethyl, propyl, butyl, or phenyl;
Q is at least one of carboxylic ester, thioester, amide, urethane, urea, ether, amine, a residue derived from isocyanate, hydroxy alkylidene amine, and hydroxy alkylidene ether;
G is at least one of —H, —OH, —COOH, a phosphate, a phosphonate, a phosphinate, sulfate, sulfonate, sulfinate, borate, and amine;
n=10–500;
m=2–10.

14. The method of claim 13, wherein the oligomeric dispersant has at least two functional G residues.

15. The method claim 13, wherein the oligomeric dispersant is represented by a structure selected from the group consisting of:

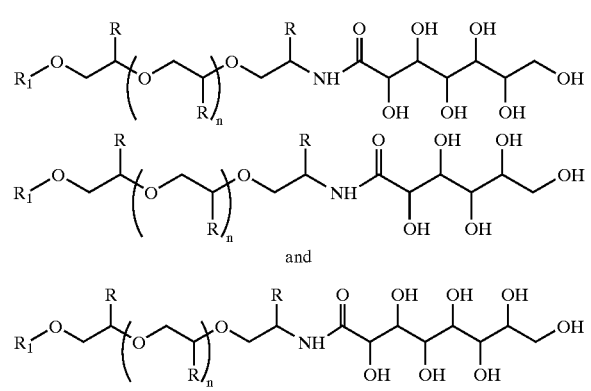

wherein

R₁ is at least one of H, $C_1$–$C_{18}$ alkyl, phenyl, benzyl, or alkyl sulfonate;

each R is independently at least one of H, methyl, ethyl, propyl, butyl, or phenyl;

n=10–500.

16. The method of claim 1 wherein the oligomeric dispersant is represented by the following structure:

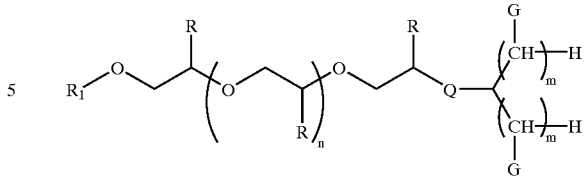

wherein
R₁ is at least one of H, $C_1$–$C_{18}$ alkyl, phenyl, benzyl, or alkyl sulfonate;
each R is independently at least one of H, methyl, ethyl, propyl, butyl, or phenyl;
Q is at least one of carboxylic ester, thioester, amide, urethane, urea, ether, amine, a residue derived from isocyanate, hydroxy alkylidene amine, and hydroxy alkylidene ether;
G is at least one of —H, —OH, —COOH, a phosphate, a phosphonate, a phosphinate, sulfate, sulfonate, sulfinate, borate, and amine;
n=10–500;
m=2–10.

17. The method of claim 16, wherein the oligomeric dispersant contains at least two functional G residues as counted across the entire composition.

18. The method of claim 16, wherein the oligomeric dispersant is represented by the following structure:

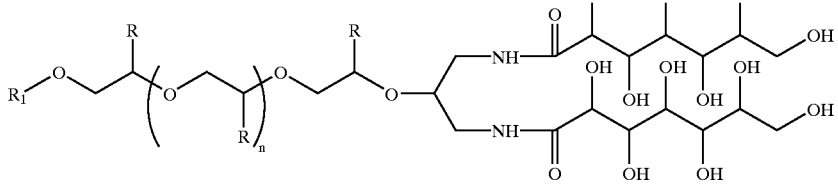

wherein
R₁ is at least one of H, $C_1$–$C_{18}$ alkyl, phenyl, benzyl, or alkyl sulfonate;
each R is independently at least one of H, methyl, ethyl, propyl, butyl, or phenyl;
n=10–500.

19. The method of claim 1 wherein the hydraulic cement is portland cement.

20. The method of claim 1 wherein the mixture additionally contains a pozzolan.

21. The method of claim 20, wherein, the pozzolan is one of silica fume, a fly ash, slag, calcined clay, and mixtures thereof.

22. The method of claim 20, wherein, the pozzolan is added in an amount from about 5% to about 70% based on the weight of cementitious material.

23. The method of claim 1 wherein said forming is one of i) placing said mixture in a mold and vibrating said mold and ii) extruding said mixture through a die.

24. The method of claim 1 wherein if present the surface active agent/air entraining agent is selected from the group consisting of anionic surfactants, cationic surfactants, nonionic surfactants, natural resin, synthetic resin, natural rosin, synthetic rosin, any inorganic air entraining agent, and mixtures thereof.

25. The method of claim 24, wherein the surface active agent/air entraining agent is selected from the group consisting of alkanolamides, alkanolamines, alkylaryl sulfonates, polyethylene oxide-polypropylene oxide block copolymers, alkylphenol ethoxylates, fatty acids, ethoxylates of fatty acids, sulfonates of fatty acids, sulfates of fatty acids, fluorocarbon containing surfactants, silicon containing surfactants, olefin sulfonates, olefin sulfates, and mixtures thereof.

26. The method of claim 25, wherein the surface active agent/air entraining agent is selected from the group consisting of ethoxylated nonylphenol, alpha olefin sulfonate, cocamide DEA, and mixtures thereof.

27. The method of claim 1 wherein if present the surface active agent/air entraining agent is present in an amount from about 0.001% to about 0.4% based on the weight of the cementitious material.

28. The method of claim 1 wherein if present the surface active agent/air entraining agent is present in an amount from about 0.005% to about 0.20% based on the weight of the cementitious material.

29. The method of claim 1 wherein if present the weight ratio of the surface active agent/air entraining agent to the oligomeric dispersant is from about 1:10 to about 10:1.

30. The method of claim 29, wherein the weight ratio of the surface active agent/air entraining agent to the oligomeric dispersant is from about 4:6 to about 6:4.

31. A dry cast cementitious article produced by the method of any of claims 1–30.

* * * * *